United States Patent [19]
Hunsberger

[11] 3,811,335
[45] May 21, 1974

[54] ADJUSTABLE WORM DRIVE UNIT

[75] Inventor: Arnold Hunsberger, Dellzura, Calif.

[73] Assignee: U.S. Elevator Manufacturing Corporation, Spring Valley, Calif.

[22] Filed: Apr. 25, 1973

[21] Appl. No.: 354,328

[52] U.S. Cl. ................................ 74/409, 74/425
[51] Int. Cl. ...................... F16h 55/18, F16h 1/16
[58] Field of Search ............................ 74/409, 425

[56] References Cited
UNITED STATES PATENTS

| 2,929,317 | 3/1960 | Baumgartner et al. | 74/409 UX |
| 3,029,659 | 4/1962 | Geyer | 74/409 |
| 3,463,030 | 8/1969 | Nuccel | 74/409 |

*Primary Examiner*—Leonard H. Gerin
*Attorney, Agent, or Firm*—Brown and Martin

[57] ABSTRACT

A worm drive unit, particularly for heavy duty use, with means for adjusting the worm gear to take up play or wear in the drive. The worm gear shaft is supported at both ends in bearings which are eccentrically adjustable simultaneously by externally coupled linkage to ensure alignment. Adjustment over a wide range can be made rapidly without dismantling any portion of the unit and, in most instances, without disconnecting the drive couplings to the unit.

6 Claims, 6 Drawing Figures

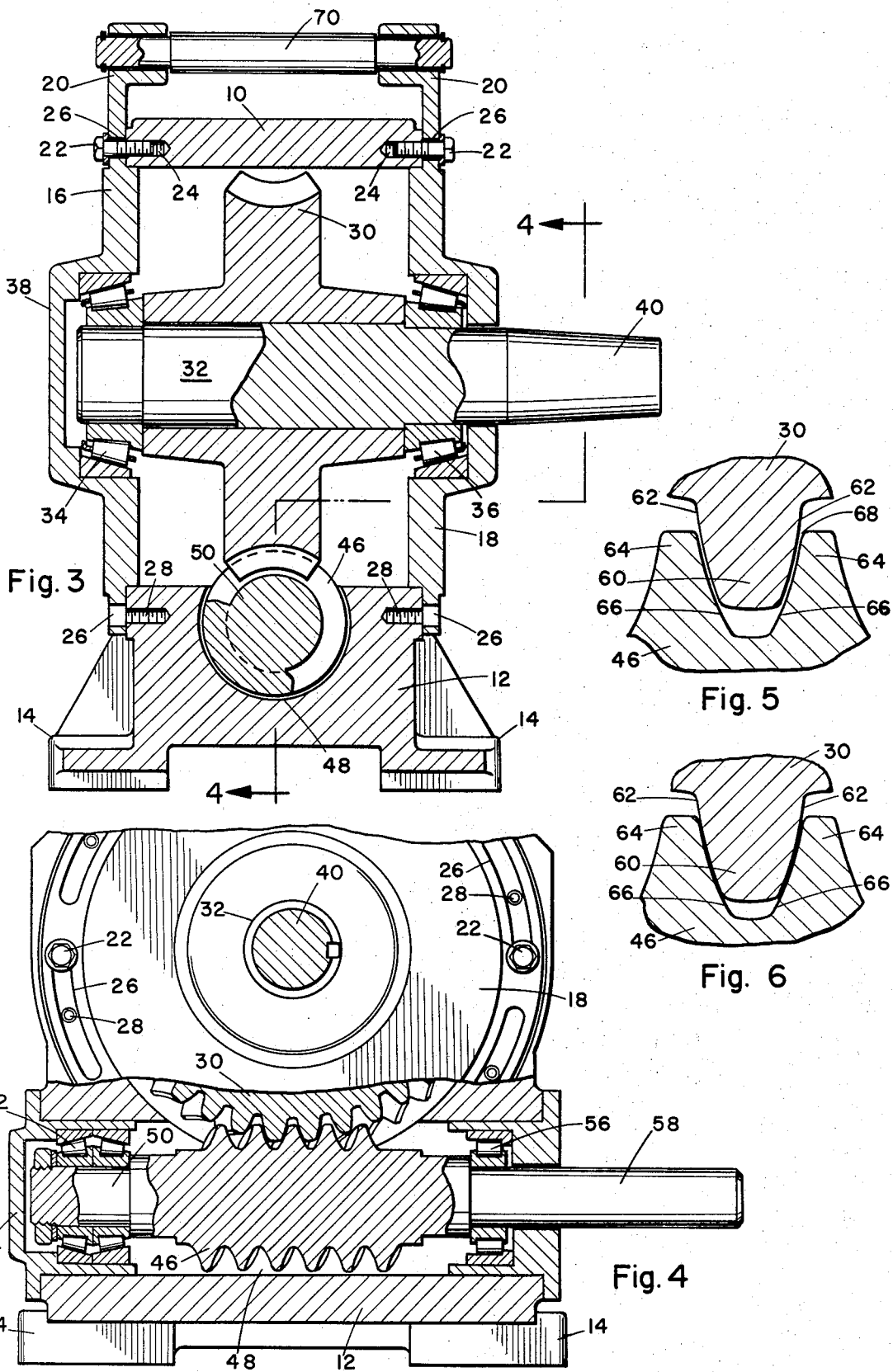

ADJUSTABLE WORM DRIVE UNIT

BACKGROUND OF THE INVENTION

All gear drive mechanisms are subject to wear, particularly those used in continuous heavy duty operation. Improper fit of the gears causes play and backlash, and accelerates wear. Adjustment of the gears usually requires at least partial dismantling of the mechanism and associated apparatus. As an example, in a large heavy duty worm drive, such as used in a passenger elevator installation, the bearings for either the worm or the worm gear are usually adjusted by inserting or removing shims. This entails loosening or removing portions of the bearing supports and is a lengthy process, which necessitates shutting down the operation of the mechanism. It would be a distinct advantage to be able to make such adjustments without dismantling or disconnecting the drive, preferably as a part of routine maintenance when found necessary.

SUMMARY OF THE INVENTION

The worm drive unit described herein can be adjusted quickly without removing, dismantling, or disconnecting any parts of the drive unit or associated apparatus. In the unit, the worm gear is supported at both ends in bearings which are carried in end plates of the housing enclosing the drive. The end plates are rotatable about the axis of the housing and the bearing axis is slightly eccentric relative to the housing axis. Thus the worm gear can be moved toward the worm by merely loosening the fastening means for the end plates. An external link connects the two end plates, for simultaneous and equal adjustment of the bearings with a single motion. Unless the installation is extremely confined, the end plate fastenings will be accessible without the need for moving adjacent equipment. The structure is adaptable to various types of worm mechanisms, bearings and shaft arrangements.

The primary object of this invention, therefore, is to provide a new and improved adjustable worm drive unit.

Another object of this invention is to provide a new and improved worm drive unit in which the worm gear is adjustable over a wide range, without requiring removal of any structure.

A further object of this invention is to provide a new and improved worm drive unit having external means for rapid and precise adjustment.

Other objects of this invention will become more apparent upon a reading of the following detailed description and an analysis of the drawings wherein like reference numerals designate like parts throughout and in which:

FIG. 3 is a sectional view taken on line 3—3 of FIG. 1.

FIG. 4 is a sectional view taken on line 4—4 of FIG. 3.

FIG. 5 is an enlarged sectional view of a typical gear tooth arrangement before adjustment.

FIG. 6 is a view similar to FIG. 5, but with the teeth adjusted and properly seated.

DESCRIPTION OF THE PREFERRED EMBODIMENT

Figure 1:
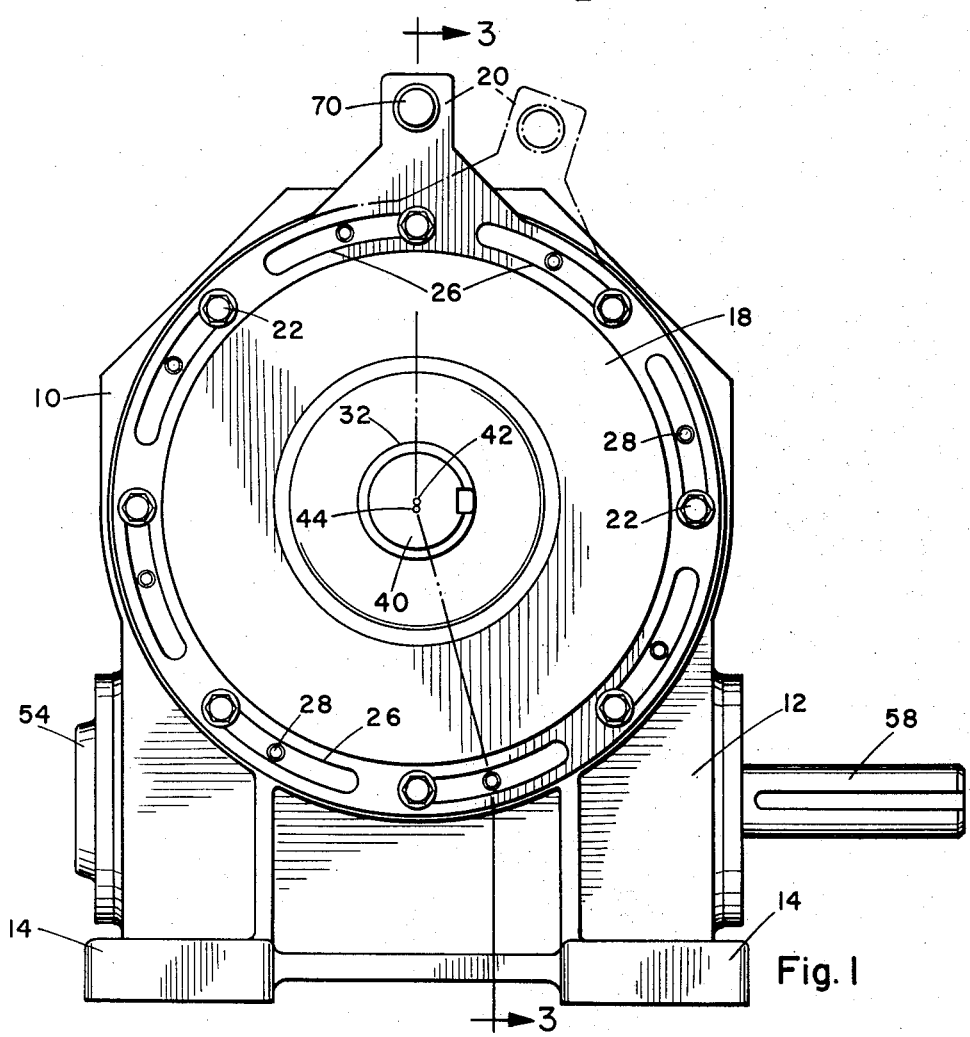
FIG. 1 is a side elevation view of the complete drive unit.

The gear mechanism is contained in a generally cylindrical housing 10, having an extended base portion 12 with feet 14 for securing the unit to a mounting. The exact configuration will depend on the particular application of the unit. Housing 10 is enclosed by a pair of circular end plates 16 and 18, each having a radially extending arm 20. Each end plate is held by a plurality of bolts 22 screwed into a set of circumferentially spaced threaded sockets 24 in the housing. Bolts 22 pass through circumferentially elongated slots 26 in the end plate, which allow limited rotation of the end plate on the housing. To extend the range of rotation, the housing has a second set of threaded sockets 28 spaced between sockets 24.

Mounted in housing 10 is a worm gear 30 on a shaft 32, which is journalled in bearings 34 and 36 in the end plates 16 and 18, respectively. As illustrated, end plate 16 has a closed cover 38 over bearing 34, while shaft 32 has an end 40 projecting from end plate 18. For some uses it may be desirable to use a double ended shaft, the configuration not being important. The bearings are slightly eccentric in the end plates, so that the axis 42 of shaft 32 is offset from the center of radius 44 of the end plate slots 26.

In the base portion 12 is a worm 46, rotatably mounted in a bore 48 perpendicular to the axis of shaft 32. Worm 46 has a shaft 50, one end of which is journalled in a double thrust bearing 52 in a closed cap 54. The other end of shaft 52 is journalled in a bearing 56 and has an end 58 extending from the housing. The worm shaft could also be double ended and other types of bearings used to suit specific purposes.

The structure is particularly suitable for gear teeth of involute or similar configuration, with curved contacting faces. Flat faced gear teeth tend to wear and form steps in the contacting faces, making it impractical to seat the teeth properly to allow for wear. Curved faced teeth tend to wear more evenly over large areas of the contacting faces.

As illustrated in FIG. 5, each tooth 60 of worm gear 30 has convex faces 62, while the teeth 64 of worm 46 have corresponding concave faces 66. A small gap 68 is indicated between the meshing teeth, as being due to wear or misalignment. The worm gear can be properly seated in the worm, as in FIG. 6, by rotating end plates 16 and 18 to move the worm gear axis 42 toward the worm.

Figure 2:
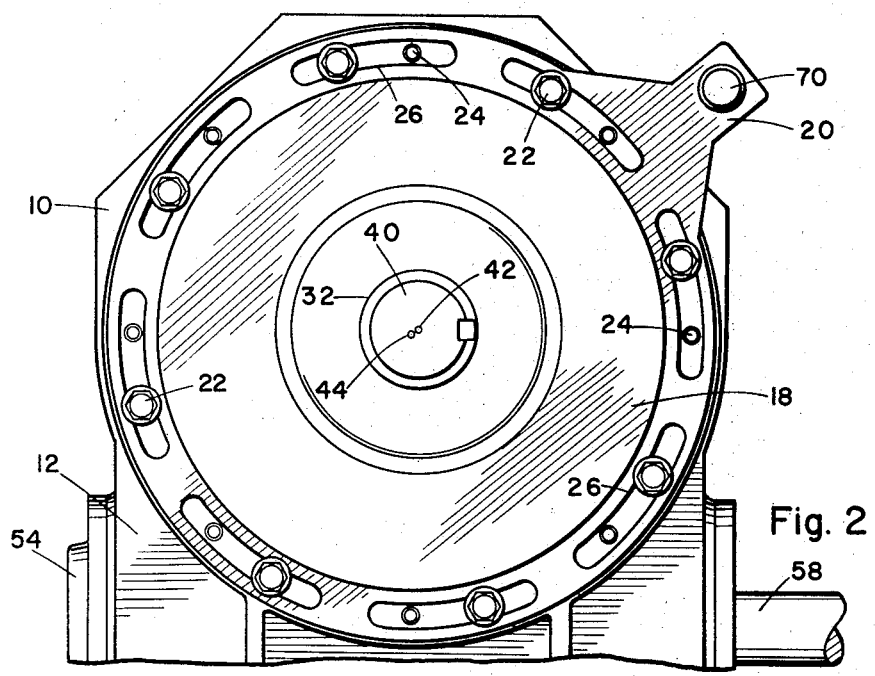
FIG. 2 is a partial side elevation view illustrating an adjusted position of the worm gear.

To facilitate the operation and ensure equal eccentric motion of bearings 34 and 36, the arms 20 are connected by a link bar 70, serving as a handle by which both end plates can be moved simultaneously. In FIG. 1 the full line position of the end plates and arms 20 represents the maximum separation of the worm gear axis from the worm. The broken line position of arms 20 indicates a slight rotation of the end plates. If it is necessary to rotate the end plates more than the amount allowed by slots 26, the bolts 22 can be moved to the other set of sockets 28 to extend the range of motion, as in FIG. 2. Normally it will only be necessary to loosen bolts 22 to allow the end plates to be turned. In most installations this can be accomplished without having to disconnect the drive couplings to the unit. Link bar 70 is clear of the housing and provides ample leverage for the gears to be seated manually, even in a large unit, and also allows the operator to feel when the gears are seated.

Having descrbied my invention, I now claim:

1. An adjustable worm drive unit, comprising:
    a substantially cylindrical housing having an extended base portion;
    a pair of end plates adjustably rotatably mounted on opposite ends of said housing;
    said end plates having bearings thereon, with the common axis of the bearings offset from the axis of rotation of the end plates;
    a worm gear mounted in said housing and journalled in said bearings;
    and a worm rotatably mounted in said base portion in meshed engagement with said worm gear.

2. A worm drive unit according to claim 1, and including adjustment means interconnecting said end plates for simultaneous and equal adjustment.

3. A worm drive unit according to claim 1, wherein each of said end plates has an extended arm, and a link bar secured between the arms for interconnecting said end plates.

4. A worm drive unit according to claim 3, wherein said arms extend substantially radially and said link bar is spaced from the housing to provide a handle.

5. A worm drive unit according to claim 4, wherein said end plates have circumferentially elongated slots, said housing having a set of circumferentially spaced threaded sockets in each end, and bolts through said slots into said sockets for releasably securing the end plates to the housing.

6. A worm drive unit according to claim 5, wherein said housing has second sets of threaded sockets intermediate the first mentioned sets.

* * * * *